United States Patent [19]

Bertram et al.

[11] 3,728,534

[45] Apr. 17, 1973

[54] CONSTRUCTABLE LOGIC SYSTEM

[75] Inventors: Uwe Bertram; Rolf Isernhagen, both of Hamburg; Hans Neuhaus, Norderstedt; Jurgen Schwandt; Ludolf Stewen, both of Hamburg, all of Germany

[73] Assignee: U.S. Phillips Corporation, New York, N.Y.

[22] Filed: July 30, 1971

[21] Appl. No.: 167,634

[30] Foreign Application Priority Data

Feb. 10, 1971 Germany....................P 21 06 257.7

[52] U.S. Cl. .......................235/184, 35/30, 235/152, 307/207, 307/215, 328/93

[51] Int. Cl............................G06f 7/48, H03k 19/36

[58] Field of Search......................235/184, 185, 152, 235/164; 340/172.5; 307/215, 207, 203; 35/10, 13, 30

[56] References Cited

UNITED STATES PATENTS

| | | | |
|---|---|---|---|
| 3,446,990 | 5/1969 | Goldberg | 307/215 |
| 3,558,868 | 1/1971 | Sauvan et al. | 235/184 |
| 3,505,653 | 4/1970 | Kautz | 340/172.5 |
| 3,428,903 | 2/1969 | Forslund et al | 307/215 |
| 3,309,793 | 3/1967 | Bartee | 35/10 |
| 3,100,943 | 8/1963 | Preston | 35/30 |
| 3,278,736 | 10/1966 | Pastoriza | 235/184 |

FOREIGN PATENTS OR APPLICATIONS

| | | | |
|---|---|---|---|
| 1,097,401 | 1/1968 | Great Britain | 35/13 |
| 222,044 | 10/1968 | U.S.S.R. | 35/30 |

OTHER PUBLICATIONS

Digital Equipment Co.; Laboratory Modules Catalog of 1962. pages 10–15, 24–39 of interest.

*Primary Examiner*—Felix D. Gruber
*Attorney*—Frank R. Trifari

[57] ABSTRACT

A constructable logic system comprising a plurality of connective circuit blocks. Each of said blocks having identical circuit logic elements. Each circuit can be individually programmed by uniquely connecting the logic elements to form an individual logical function for the circuit.

6 Claims, 4 Drawing Figures

*INVENTORS*
UWE BERTRAM
ROLF ISERNHAGEN
HANS WILHELM NEUHAUS
JÜRGEN SCHWÄNDT
LUDOLF STEWEN
*BY*
AGENT

INVENTORS
UWE BERTRAM
ROLF ISERNHAGEN
HANS WILHELM NEUHAUS
BY JÜRGEN SCHWÄNDT
LUDOLF STEWEN

AGENT

INVENTORS
UWE BERTRAM
ROLF ISERNHAGEN
HANS WILHELM NEUHAUS
JÜRGEN SCHWANDT
LUDOLF STEWEN
BY
AGENT

INVENTORS
UWE BERTRAM
ROLF ISERNHAGEN
HANS WILHELM NEUHAUS
JÜRGEN SCHWANDT
LUDOLF STEWEN
BY [signature]
AGENT

CONSTRUCTABLE LOGIC SYSTEM

The invention relates to a constructable logic system, comprising at least two adjacently arrangeable block elements each having electrical connection terminals and an electronic circuit.

Devices of this kind are known in various forms. In one embodiment the block elements accommodate mechanically actuated switches, the contacts of which are connected outside the block element. The possibilities therewith, however, are limited so that only limited logical systems can be constructed. Another embodiment comprises electronic circuit elements in block elements which can be assembled by means of plug connections and from which electronic wiring gates can be constructed. Also in this case a large logical system involves an extremely extensive construction, as each gate already requires a plurality of block elements.

Moreover, because block elements having different functions are used, a very large overall number of block elements is required in order to have a sufficient number of block elements of each kind available for realizing different logical systems. On the other hand, very simple block elements which contain only few circuit elements and which are suitable for various uses readily result in an unclear circuit lay-out.

The invention provides a device enabling a use as varied as possible of the available block elements, whilst a clear lay-out is maintained. According to the invention this object is fulfilled in that the invention is characterized in that the electronic circuit is the same for at least a group of block elements and comprises a plurality of logical elements, a plurality of inputs and outputs of which are connected to the connection terminals, at least two intermediate connection terminals of the connection terminals of one and the same block element being mutually connectable.

Each block element thus accommodates a programmable circuit and can thus realize the most diverse logical functions in accordance with the established connection, so that only one type of block element is required, even if large logical systems are to be constructed. This also enables the demonstration of the construction of more complex integrated circuits by programming the block elements first for simple logical functions such as an AND-gate or an OR-gate, and next a more complex logical function such as, for example, an adder stage by connecting the block elements thus programmed, and finally by realizing this more complex function in a block element by changing the connections, the other block elements thus becoming available again.

The programming, i.e. the establishing of connections between the intermediate connection terminals, can be effected in various manners. For example, the intermediate connection terminals may be provided in the form of plug-connections or screw-connections on the top of the block element, in particular between the input connection terminals and the output connection terminals, the connections being established by means of wires. To facilitate the latter, cards are provided for each logical function that can be realized by means of a block element, said cards directly showing the connection pattern of the intermediate connection terminals required for this function.

In order to construct a logical system which is as observable as possible by appropriate connection of the input terminals and the output connection terminals, visibility of the intermediate connection terminals is not necessary, as it may give rise to confusion. It would be more efficient if the function of each block element could be read directly. Therefore, according to a further embodiment of the invention a plate is connected to each card, said plate covering the intermediate connections, i.e. when it is hinged over the card and hence over the intermediate connection terminals, and then showing a logical circuit diagram of the function realized between the input connection terminals and the output connection terminals. In this way the logical construction is particularly easy to follow. Logical circuit elements are thus produced which, however, are all constructed from identical block elements.

The card itself, however, can also accommodate the connection pattern of the intermediate connection terminals as electrically conducting connections, somewhat in the form of printed circuits, which come into electrical contact with the intermediate connection terminals when the card is inserted. Consequently, the contacts of the intermediate connection terminals are constructed to be resilient, or the card is provided with resilient contacts on the lower side and with on the the top side a plate accommodating the logical circuit diagram as described above.

During operation of the device it is advantageous to have the state of at least one output displayed. For this purpose each block element is provided with an indicating member such as, for example, a lamp which is controlled by the output signal.

A more advantageous and more surveyable construction can be obtained by means of block elements having two outputs, the signal of one output being the complement of the signal of the other output. This makes inversion of input signals superfluous.

Though the number of input connections is arbitrary, the logical circuit accommodated in the block element becomes very extensive in the case of a large number, and the number of intermediate connections and the number of possible logical functions become unsurveyably large. It is therefore practical to provide three inputs which should be sufficient in most cases. On the other hand, it is thus also possible to form a majority circuit or minority circuit in one block element or an adding stage for the binary addition of two input signals and one transmission signal.

Multi-stage universal logical circuits, capable of forming all possible logical functions for the relevant number of input signals, have been described in general several times already. A special universal circuit for three inputs is characterized in that three input terminals and four logical AND-gates are provided, it being possible to apply the signals on two of the input terminals to the four AND-gates either in an inverted or a non-inverted form so that the four possible logical AND-functions of the signals on said two input terminals can be formed, the intermediate connection terminals being divided into a first and a second group, inputs of a number of AND-gates being connected to intermediate connection terminals of the first group, one of the intermediate connection terminals of the second group being connected to the signal of a logical one, a second intermediate terminal being connected to the signal of a logical zero, a third intermediate connection terminal being connected to the signal of a logical zero, a third intermediate connection terminal being connected directly and a fourth intermediate connection terminal being connected via an invertor to said third input terminal, a logical OR-gate being connected to the outputs of said logical AND-gates. Such a circuit enables simple programming as at the most only four connections are required between both groups of four intermediate connections each; on the other hand, however, all theoretically possible combination functions of the three input signals can be formed. This amounts to $2^8=256$ functions.

In order that the invention may be readily carried into effect, some embodiments thereof will now be described in detail, by way of example, with reference to the accompanying diagrammatic drawings, in which.

Figure 1:
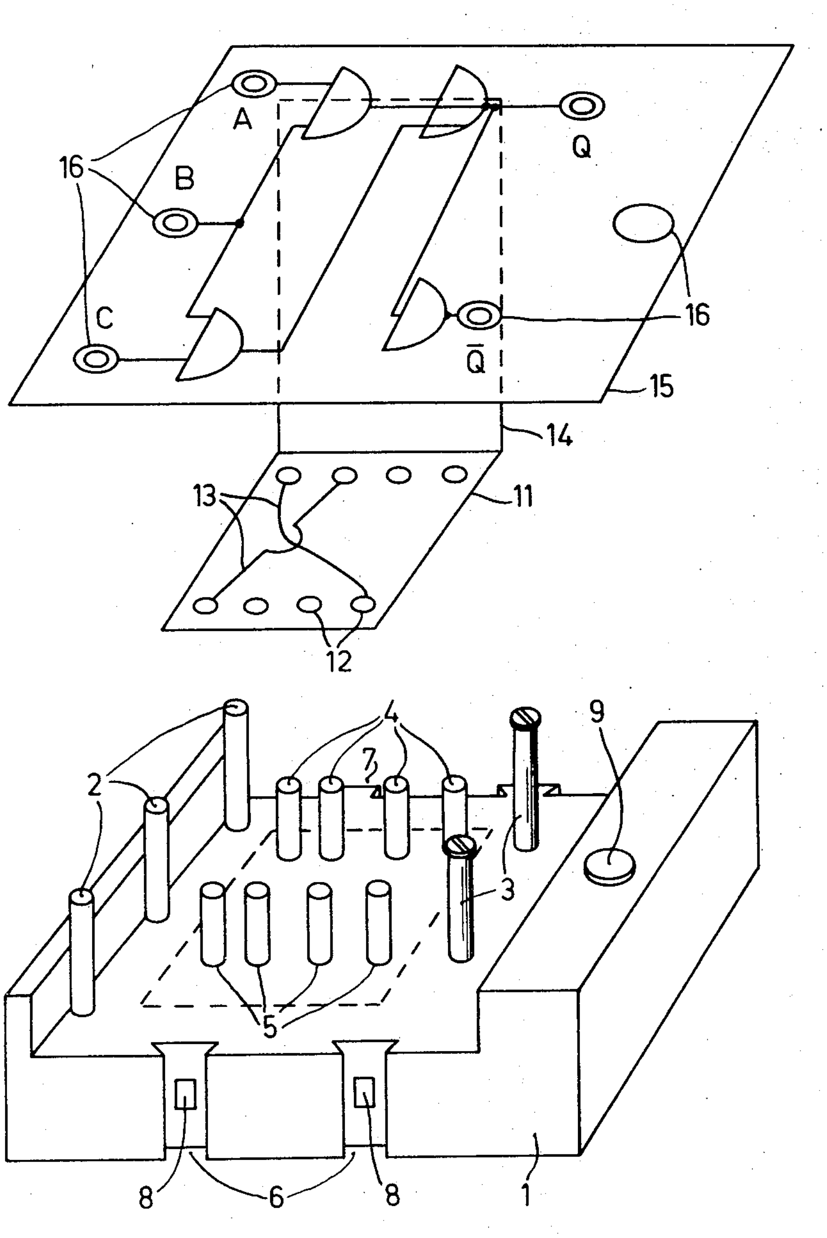
FIG. 1 shows a block element and the arrangement of the connections.

In FIG. 1 the block element 1 has e.g. a rectangular or square basic dimension. On the one side are provided dovetail-shaped recesses 6 and corresponding projections 7 are provided on the opposite side. Consequently, a plurality of such block elements can be slid together to form a row. The contacts 8, provided in the recesses 6 and on the projections 7 not shown, represent the electrical connection for the power supply. These recesses and projections can also be additionally provided on the left-hand and on the right-hand side.

In a recess at the top of the block element 1 three input connection terminals 2 are situated at the left-hand side and two output connection terminals 3 are situated at the right-hand side. Situated between these connection terminals are two groups of four intermediate connection terminals 4 and 5. Above the recess and adjoining the output connection terminals 3 a lamp 9 is situated which indicates the signal state of one of the outputs 3. The connection terminals consist of split threaded bushes in which a laterally inserted unclad metal wire is clamped by means of a screw which is screwed into the bush. However, other kinds of clamping or plugging devices may alternatively be used.

In order to realize a given logical function by means of a block element, the intermediate connection terminals 4 and 5 are to be connected in a particular manner. This is facilitated in that between the intermediate connection terminals a card 11 is inserted which directly displays the connection pattern 13. For proper location of the card, it is made to extend beyond the intermediate connection terminals which thus protrude through apertures 12 in the card 11. The connections are established by means of single wires which are secured in the intermediate connection terminals by screwing or clamping. This, however, is not illustrated in FIG. 1.

A block element thus provided with intermediate connections shows a number of connection terminals and connections at its top, of which, however, only the input and output connection terminals may be required if a number of block elements are combined, so that an unclear lay-out is obtained. Therefore, a plate 15 is attached to each card via a tag 14, said plate covering the intermediate connection terminals and hence their connections, and instead showing a logical circuit diagram of the function realized by the connections. For this purpose, the plate 15 has approximately the size of the block element and rests on the left-hand and the right-hand portion of the block element. The input and output connection terminals protrude above these portions of the block element and protrude through corresponding apertures 16 in the plate 15 such that they can be connected. The intermediate connection terminals 4 and 5, however, are shorter and are covered by the plate, so that the appearance of the block element comprises only input and output connection terminals, and between these terminals a visual display of the function, so that the systems constructed therewith are very surveyable.

Instead of the visual display of the connections 13, the card 11 may also directly contain the conducting connections which come into electrical contact with the intermediate connection terminals 4 and 5 when the card is inserted, the intermediate connection terminals 4 and 5 having to be resilient for this purpose. The card 11 may also be combined with the plate 15 to form a block having, for example, contact pins instead of the apertures 12, said pins being inserted into correspondingly designed intermediate connection terminals. This provides a very stable construction.

Figure 2:
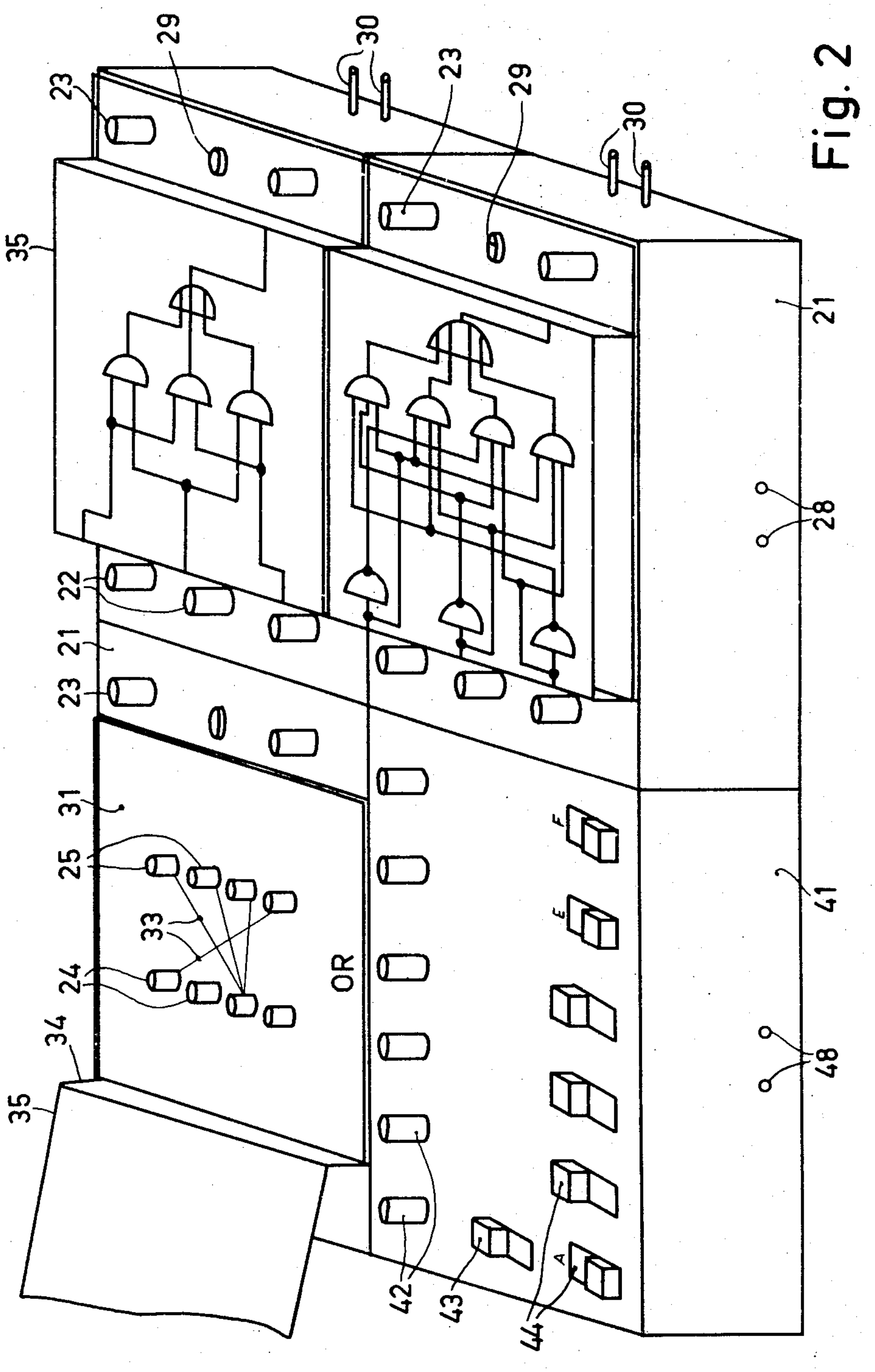
FIG. 2 shows a combination of three block elements of slightly different construction and one input block element.

FIG. 2 shows the interconnection of a plurality of block elements 21, the construction of which is slightly different from FIG. 1. The block elements are square and on their flat top surface they accommodate the input connection terminals 22, the output connection terminals 23, the indicating lamp 29 and the intermediate connection terminals 24 and 25 which are again divided into two groups. On each side of the block element two sockets are provided for the power supply in which the contact pins 30 are inserted or screwed. The block elements are electrically and mechanically connected by means of this contact arrangement.

In this case the cards 31 with the visual display of the connections 33 cover almost the entire area between the input and the output connection terminals 22 and 23. The plates 35 are connected to the cards via the tags 34, said plates being hinged over the intermediate connection terminals, thus covering them and instead displaying a logical circuit diagram.

In addition, FIG. 2 shows another block element 41 which has the same dimensions as the block elements 21 but which is of another construction and which serves for the input of information. For this purpose it comprises a number of switches 44 by means of which the signal "0" or "1" is adjusted at the opposite output. Moreover, this block element preferably accommodates the power supply for the other block elements, for example, dry cells, accumulator batteries or main units, which are switched on and off by means of the switch 43.

Figure 3:
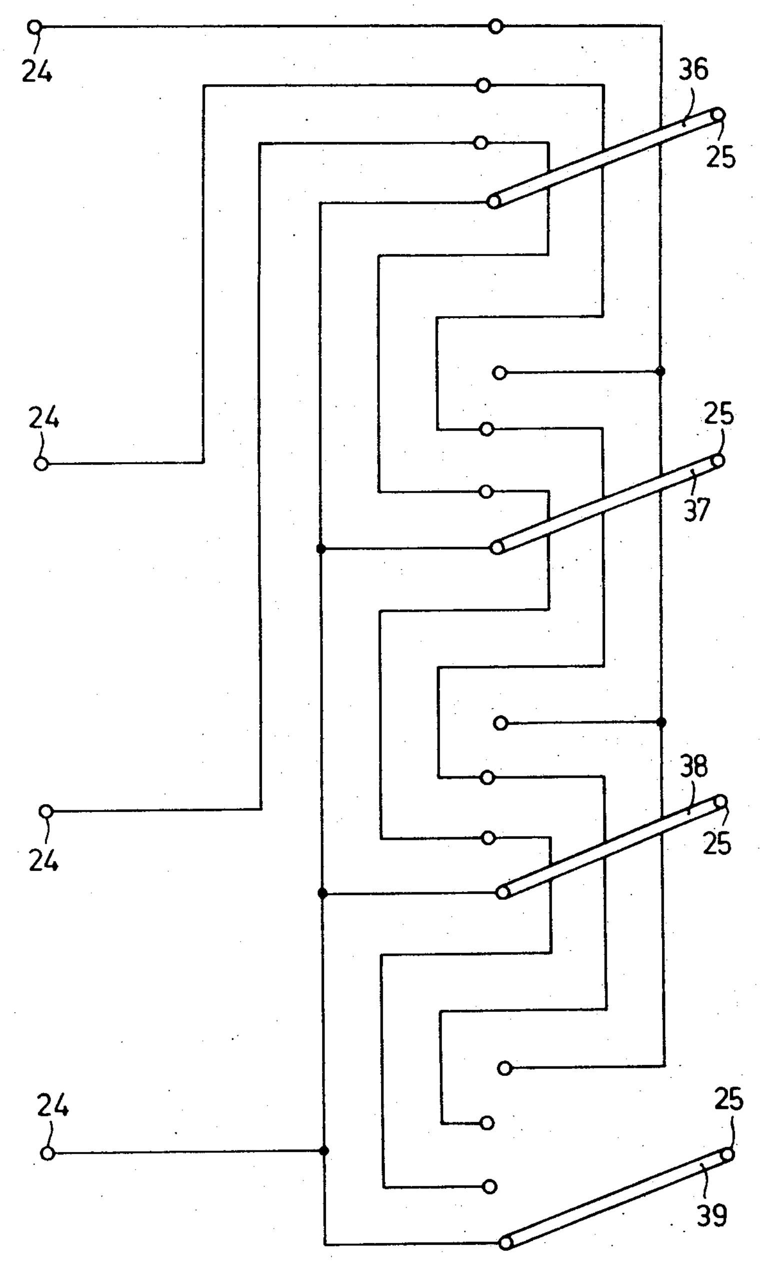
FIG. 3 shows some intermediate connections.

The connections can also be established by means of short-circuit brackets, all of which preferably have the same dimensions as is shown in FIG. 3. For this purpose, each of the intermediate connection terminals 24 is to have four contacts which are arranged on a circular are around the other intermediate connection terminals 25 in order that the short-circuit plugs 36 to 39 can be inserted in all positions. The contacts are preferably provided as tubular rivets on a printed circuit board, accommodating the wiring in a form approximately as shown in FIG. 3. The short-circuit brackets may also be replaced by a tag the tip of which engages in the contacts said tag being located in a pivoting manner about the connection terminals 25 and possibly being securable by means of screws, so that the connection members required for programming the block element are always present on the block element. These tags may also be the switching arm of a rotary switch, the counter-contacts of which are formed directly by the printed-circuit board.

Figure 4:
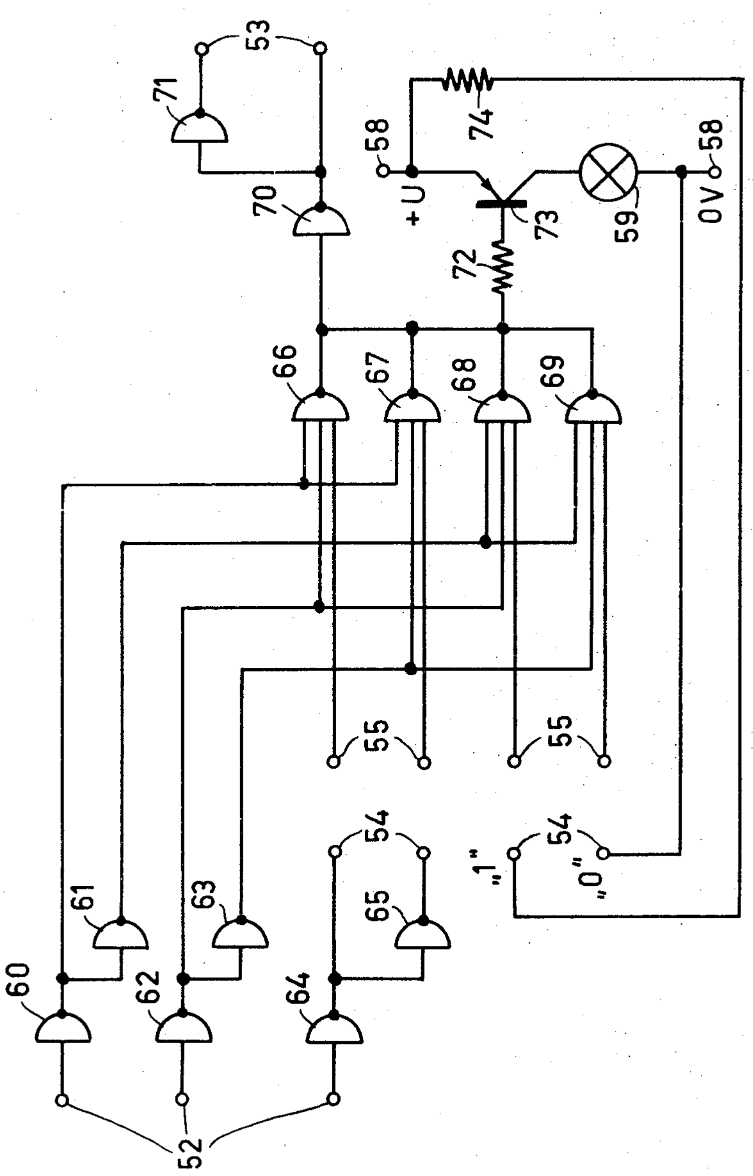
FIG. 4 shows the universal circuit in a block element.

The construction of the universal logical circuit for three input connection terminals is shown in FIG. 4. Each of the three inputs 52 is connected to an inverter 60, 62 and 64, which serve in particular for amplifying the input signals or for reducing the input load. The output of each invertor is always connected to a further invertor 61, 63 and 65. Consequently, the original input signals as well as the inverted input signals are available in an amplified form.

The outputs of the invertors 60 to 63 are connected to four NAND-gates 66 to 69 such that all possible combinations of the signals of the first two inputs are provided. Each of the NAND-gates 66 to 69 has a further input which is connected to the first group of the intermediate connection terminals 55. One connection terminal of the second group of intermediate connection terminals 54 is connected to OV, which is applied to the block element via one of the connection terminals 58, and thus permanently has the potential of the logical "0". A further connection terminal is connected, via a protection resistor 74, to the operating voltage +U, which is applied to the block element via the other connection terminal 58, and thus permanently has the potential of the logical "1." Both other connection terminals are connected to the invertors 64 and 65, respectively, and thus carry the original and the inverted signal, respectively, of the third of the inputs 52.

The outputs of the NAND-gates 66 to 69 are wired together as shown in FIG. 4. The resistor 72 is a current-limiting resistor via which the transistor 73 is driven, the latter controlling the lamp 59 so as to indicate the signal state of the output. The output signals are applied to the output connection terminals 53 for amplification via an invertor 70 and are applied via a further invertor 71 for inversion.

In order to obtain an AND-junction of the three signals present on the inputs 52 by means of this circuit, i.e. in order to program the block element as an AND-gate, the other input of the NAND-gate 69 is connected to the output of the invertor 65 and the other inputs of the NAND-gates 66 to 68 are connected to the connection terminal for the logical "0." In that case only the NAND-gate 69 is active and due to the invertor 70 functions with respect to the output as an AND-gate. An OR-junction is formed by connecting the other input of the NAND-gate 66 to the output of the invertor 65 and by connecting the other inputs of the NAND-gates 67 to 69 to the logical "1." If all inputs 52 receive the logical "0"-signal, at least one input of all NAND-gates 66 to 69 receives a logical "0"-signal. Consequently, all the outputs thereof carry a logical "1"-signal, so that a "0"-signal is present on the output of the invertor 70. However, as soon as at least one of the three inputs 52 receives a "1"-signal, at least one of the NAND-gates 66 to 69 also receives a logical "1"-signal, on all three inputs thus producing a logical "0"-signal on the connection of the outputs of the NAND-gates 66 to 69 and, consequently, a logical "1"-signal on the output of the invertor 70 as is required for the OR-function. In this procedure all NAND-gates 66 to 69 are involved.

All other functions can be explained in an analogous manner.

What is claimed is:

1. A constructable logic system, comprising a plurality of adjacently connective block elements, at least some of the block elements having input terminals, output terminals, and a first and a second group of intermediate terminals, logic circuitry connected between said input terminals and said first group of intermediate terminals, and also between said second group of intermediate terminals and said output terminals, said intermediate terminal groups interconnectable by conductor means for forming a given logic function in said block element.

2. A constructable logic system as claimed in claim 1 wherein the conductor means between the intermediate connection terminals is a card which can be inserted therebetween, and on which intermediate connections are indicated which are required for forming a given logical function in said block element.

3. A constructable logic system as claimed in claim 2, wherein said insertable card comprises connection lines which form said intermediate connections when the card has been inserted.

4. A constructable logic system as claimed in claim 3, wherein a signalling member is provided by which a signal state of an output of said circuit can be signalled.

5. A constructable logic system as claimed in claim 4, wherein the circuit is provided with three input terminals and four logical AND-gates to which signals can be applied to said AND-gates via two of said input terminals either in an inverted or a non-inverted form so that four possible logical AND-functions can be formed, said intermediate connection terminals being divided into a first and a second group, inputs of a number of AND-gates being connected to intermediate connection terminals of the first group, one of the intermediate connection terminals of the second group being connected to a signal of a logical one, a second intermediate connection terminal of said second group being connected to a signal of a logical zero, a third intermediate connection terminal of said second group being connected directly to the remaining third input terminal and a fourth intermediate connection terminal of said second group being connected via an invertor to said third input terminal, a logical OR-gate being connected to outputs of said logical AND-gates.

6. A constructable logic system as claimed in claim 5, wherein connection means are provided by means of which each block element can be connected to an adjacently arrangeable block element to form continuing energy supply lines between the adjacently arrangeable block elements.

* * * * *